United States Patent [19]
Cusick et al.

[11] Patent Number: 5,970,752
[45] Date of Patent: Oct. 26, 1999

[54] HIGH TEMPERATURE, GROOVED FILAMENT GUIDE WHICH IS COATED WITH A THERMALLY CONDUCTIVE MATERIAL

[75] Inventors: Michael John Cusick, Englewood; Larry Leroy Vair, Jr., Lakewood, both of Colo.

[73] Assignee: Johns Mavnille International, Inc., Denver, Colo.

[21] Appl. No.: 08/901,511

[22] Filed: Jul. 28, 1997

[51] Int. Cl.$^6$ .................................................. C03B 37/06
[52] U.S. Cl. ................................. 65/500; 65/508; 65/528; 65/374.13; 65/374.15
[58] Field of Search ............................. 65/500, 507, 508, 65/528, 374.13, 374.15, 370.1

[56] References Cited

U.S. PATENT DOCUMENTS

| | | | |
|---|---|---|---|
| 2,634,964 | 4/1953 | Cooper | 65/370.1 |
| 3,168,390 | 2/1965 | Theobald | 65/500 |
| 3,831,239 | 8/1974 | Hoff | 65/370.1 |
| 3,853,525 | 12/1974 | Gorman | 65/374.13 |
| 3,999,970 | 12/1976 | Barch | 65/500 |
| 4,260,404 | 4/1981 | Gorman | 65/370.1 |
| 4,414,010 | 11/1983 | Chin | 65/523 |
| 4,909,485 | 3/1990 | Yamaguchi | 65/370.1 |

FOREIGN PATENT DOCUMENTS 2038797   7/1980   United Kingdom ..................... 65/528

*Primary Examiner*—John Hoffmann
*Attorney, Agent, or Firm*—Robert D. Touslee

[57] ABSTRACT

A flame attenuation apparatus for forming flame attenuated fibers, preferably glass fibers, includes means for providing continuous filaments; burner means for providing a high temperature, high energy stream of combustion gases; means for feeding the continuous filaments into the high temperature, high energy stream of combustion gases; and an elongated rod filament guide with a plurality of grooves therein for receiving, guiding and supporting the continuous filaments, as the continuous filaments are fed into the high temperature, high energy stream of combustion gases. The elongated rod is preferably made from graphite with a boron-nitride coating and, preferably, has at least two flat surfaces and at least two curved surfaces with the grooves therein.

12 Claims, 2 Drawing Sheets

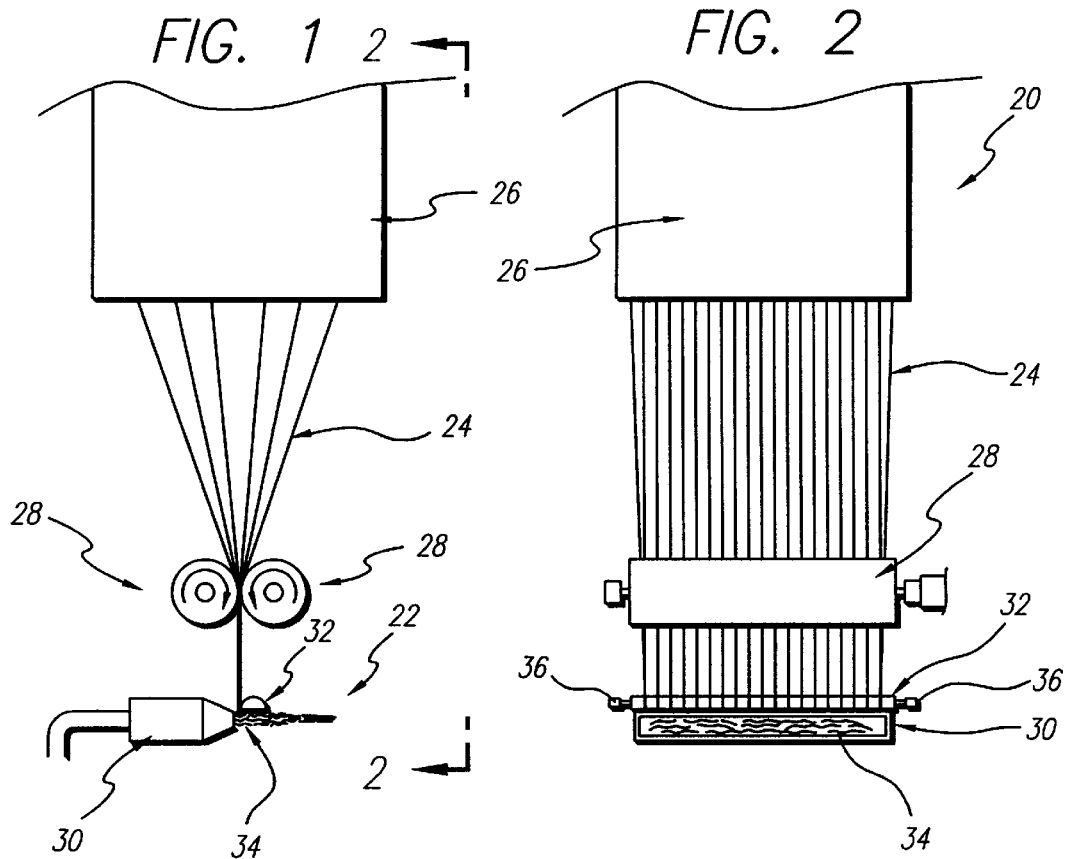
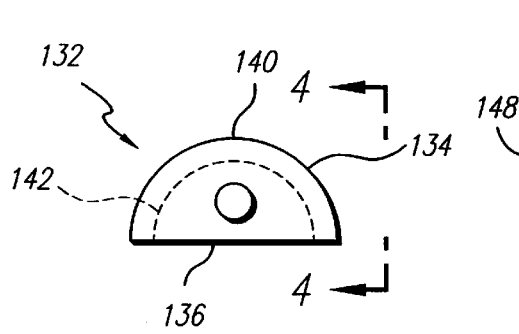
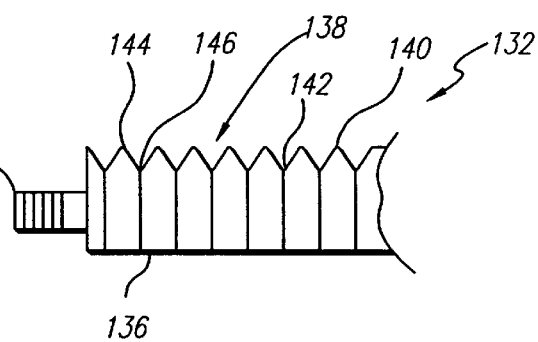

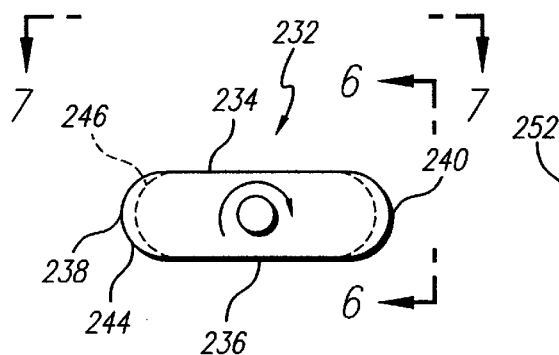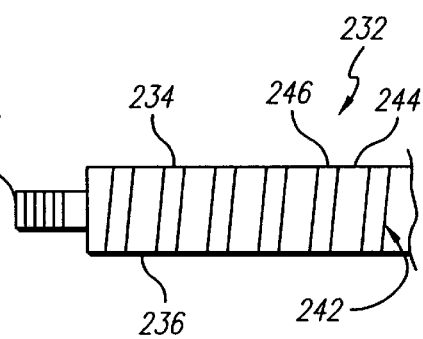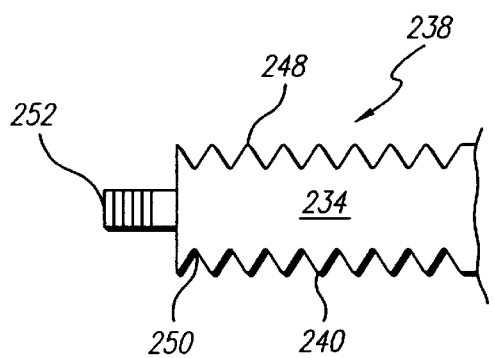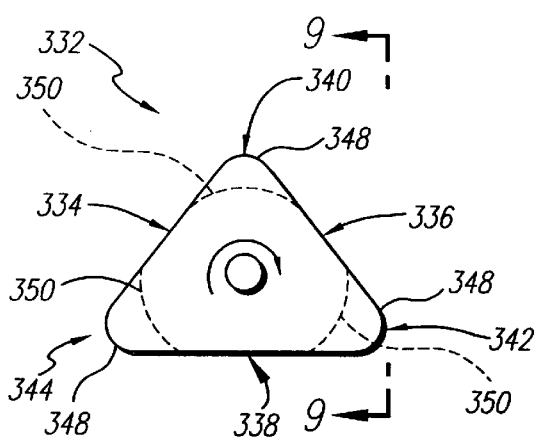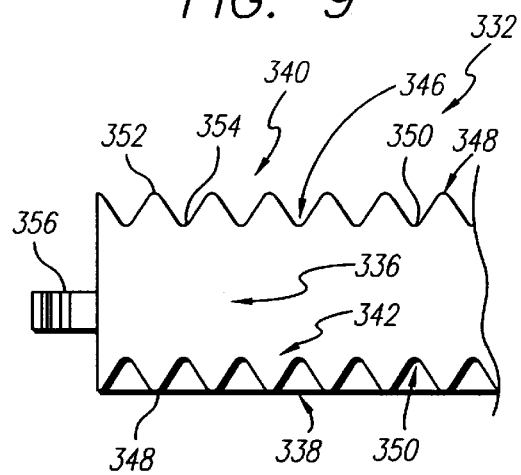

HIGH TEMPERATURE, GROOVED FILAMENT GUIDE WHICH IS COATED WITH A THERMALLY CONDUCTIVE MATERIAL

BACKGROUND OF THE INVENTION

The present invention relates to a filament guide for use in a flame attenuation fiberization process and, in particular, to a filament guide which exhibits a prolonged service life and reduces the amount of scrap created over the service life of the filament guide.

One process for manufacturing fine diameter fibers, e.g. discrete length, glass fibers typically ranging from about 0.5 microns to about 7.0 microns in diameter, is the flame attenuation process. In this process continuous primary filaments are drawn from a plurality of outlet orifices of an electrically or gas flame heated pot or melter containing a molten fiberizable material such as glass. The primary continuous filaments are drawn from the heated pot or melter by pull rolls which also function to feed the continuous primary filaments into a high temperature, high energy, gas flame that further attenuates the continuous primary filaments and forms short length, fine diameter fibers from the continuous primary filaments. A filament guide with a plurality of grooves therein, extending in generally vertically oriented planes, extends transversely across the path of travel of the continuous primary filaments immediately above the high temperature, high energy gas flame; guides the continuous primary filaments into the flame; and supports the continuous primary filaments so that the continuous primary filaments can be introduced into the flame at a specific location without being blown haphazardly about by the flame. The discrete length, fine diameter fibers, thus formed, are generally collected to form a fibrous blanket with the fibers randomly oriented within the blanket. To keep the continuous primary filaments separated from each other and prevent the continuous primary filaments from crossing each other as the continuous filaments are introduced into the flame, the filament guide is located just above the flame, e.g. about ¼ of an inch and the underside of the filament guide has a flat or planar surface so that the grooves in the filament guide which guide and support the continuous primary filaments release the continuous primary filaments immediately prior to their introduction into the flame.

Previously, the filament guides have been made of graphite, with a shape like that shown in FIGS. 3 and 4 of this specification, and have been mounted relative to the continuous primary filaments as shown in FIG. 3. These filament guides cost about three dollars per guide and generally last about four days. A primary cause of filament guide failure has been the bowing of the filament guide in its midsection due to the erosion of the flat underside of the filament guide at its midsection by the flame of the attenuation burner which weakens the filament guide.

With a four day filament guide service life, a 16 unit flame attenuated fiber production line would require about 1436 filament guides per year at a cost of about $4308 per year. While this operating cost appears to be relatively low, about $40 worth of scrap fiber is created every time one of these guides is changed resulting in a total operating cost in connection with the use of such guides of about $62,000 per year. Thus, there has been a need to increase the service life and otherwise improve the operation of these filament guides in flame attenuation fiberization processes.

SUMMARY OF THE INVENTION

A first approach to reducing the operating costs associated with the filament guides was the formation and testing of a filament guide, like that shown in FIGS. 3 and 4, from a material other than graphite. It was determined that any such material should have the following physical properties: be easily machinable; be capable of operating in a high temperature environment; and exhibit a low coefficient of thermal expansion. While several ceramic materials offer the above properties, it was also determined that the ceramic materials should have a high thermal conductivity to disperse the heat transferred to the underside of the filament guide from the burner flame throughout the filament guide and thereby reduce the rate of the erosion occurring in the midsection of the filament guide. Nitrides of aluminum and boron offer high thermal conductivity. In addition, boron-nitride exhibits a "lubricating" or "anti-stick" property and thereby facilitates the unimpeded movement of continuous primary filaments through the grooves of the filament guide.

The lubricating or anti-stick nature of the boron-nitride also serves to prevent a build-up of tape residue on the filament guide from masking tape used in the flame attenuation fiberization process to align continuous primary filaments with respect the filament guide during start-up and after a filament break-out has occurred during production. The buildup of tape residue, on the graphite filament guides previously used in the flame attenuation fiberization processes, reduced the service life of these filament guides. The boron-nitride filament guide built and tested had a service life of twenty-one days before it was removed for excessive wear. It was estimated that boron-nitride filament guides of the type tested would cost about eighty one dollars each. Thus, the 274 boron-nitride filament guides required in a year for a 16 unit flame attenuated fiber production line would cost about $22,000. When the scrap costs associated with using the boron-nitride filament guides are included, the operating costs are about $33,000 or about a $29,000 savings over the graphite filament guides previously used in the process.

While the test of the boron-nitride filament guide showed that a dramatic reduction in operating costs could be obtained, the coating of the graphite filament guides with a boron-nitride coating to disperse the heat from the burner flame more evenly throughout the filament guide has shown an even greater cost cutting potential. Several graphite filament guides, like those shown in FIGS. 3 and 4, with the grooves coated with a boron-nitride coating were tested. The average service life of these filament guides, while less than that of the boron-nitride filament guides (about fourteen days rather than about twenty-one days), was about three and one half times the four day service life of the previously used uncoated graphite filament guides. The cost of these boron-nitride coated graphite filament guides was estimated to be about six dollars each. Thus, the operating costs, using about 417 filament guides per year) and including about $17,000 of scrap of year is about $19,000 per year and the savings over the previously used graphite filament guides is about $43,000 per year for a sixteen unit flame attenuated fiber production line.

Several new designs for the filament guides also offer the potential for significant savings in operating costs by doubling, tripling or further increasing the service life of the filament guides whether made of graphite, boron-nitride or graphite coated with boron-nitride or a similar ceramic material exhibiting a high thermal conductivity.

In one embodiment, the filament guide has flat or planar upper and lower surfaces with generally curved or rounded side surfaces, that are vertically grooved, extending between the upper and lower surfaces. Preferably, this filament guide is mounted so that the filament guide can be rotated in place through 180°. Prior to the failure of the filament guide, due to the erosion of the flat surface first functioning as underside of the filament guide, the filament guide is rotated to move this eroded surface of the filament guide to a position where it becomes the upper side of the filament guide and to move the erosion free flat surface first functioning as the upper side of the filament guide into the position where it becomes the underside of the filament guide.

In another embodiment, the filament guide has a generally triangular cross section and by rotating the filament guide through 120° when one of the flat surfaces becomes eroded, three different surfaces of this filament guide can serve as the underside of the filament guide to prolong the service life of the filament guide. The use of filament guides which can be rotated in place to bring different flat surfaces of the filament guides into position to function as the under sides of the filament guides, both increases the service life of these filament guides and greatly reduces the creation of scrap caused by changing the filament guides.

BRIEF DESCRIPTION OF THE DRAWINGS

FIG. 1 is a schematic side elevation of a flame attenuation fiberizing unit for forming fine diameter, discrete length fibers from continuous primary filaments.

FIG. 2 is a schematic elevation of the flame attenuation unit of FIG. 1, taken substantially along lines 2—2 of FIG. 1.

FIG. 3 is a transverse section through a filament guide rod.

FIG. 4 is a partial view, taken substantially along lines 4—4 of FIG. 3, of the filament guide rod of FIG. 3.

FIG. 5 is a transverse section through a second filament guide rod.

FIG. 6 is a partial view, taken substantially along lines 6—6 of FIG. 5, of the filament guide rod of FIG. 5.

FIG. 7 is a partial view, taken substantially along lines 7—7 of FIG. 5, of the filament guide rod of FIG. 5.

FIG. 8 is a transverse section through a third filament guide rod.

FIG. 9 is a partial view, taken substantially along lines 9—9 of FIG. 8, of the filament guide rod of FIG. 8.

DESCRIPTION OF THE PREFERRED EMBODIMENTS

FIGS. 1 and 2 show a flame attenuation apparatus 20 for forming fine, discrete length fibers 22, such as glass or other mineral fibers, from continuous filaments 24. The flame attenuation apparatus 20 includes melters or pots 26 which are typically heated with a gas burner or electrical heating elements to maintain the fiberizable material within the melters or pots 26 at an appropriate fiberizing temperature. The bottom walls of the melters or pots 26 are each provided with a large number of fiberizing orifices from which the relatively large diameter, continuous filaments 24, commonly referred to as primary filaments, are pulled or drawn by driven pull rolls 28. After passing through the pull rolls 28, the continuous filaments 24 of each flame attenuation apparatus 20 pass through a filament guide 32 and are introduced into the flame 34 of a flame attenuation burner 30, e.g. Selas or similar burner. The high energy, high temperature flame 34 of the attenuation burner 30 attenuates the continuous filaments 24 and forms the continuous filaments into the fine, discrete length fibers 22 which are carried by the combustion gases into a collection chamber (not shown) for collection and packaging or further processing.

The filament guide 32 is typically located immediately adjacent the flame 34 of the attenuation burner 30, e.g. the bottom surface of the filament guide 32 is preferably located in a horizontal plane about ¼ of an inch above the flame 34, with the ends of the filament guide mounted in support brackets 36. As shown in FIGS. 1 and 2, the filament guide 32 extends in a direction perpendicular to or substantially perpendicular to the direction of travel of the continuous filaments 24. The filament guide 32 is located immediately adjacent the flame 34 to keep the continuous filaments 24 separated as the continuous filaments 24 are introduced into the flame 34 to keep the continuous filaments from crossing each other as the continuous filaments 24 are introduced into the flame 34 for attenuation and formation into the discrete length fibers 22. By locating the filament guide 32 immediately adjacent the flame 34 with a flat surface of the filament guide 32 immediately adjacent the flame 34, the continuous filaments 24 are guided and supported by the filament guide and then released from the filament guide in a spaced apart relationship as the continuous filaments 24 enter the flame 34. It is preferred to have the underside of the filament guide 32 flat or planar, rather than curved so that the grooves in the filament guide continue to provide guidance and support for the continuous filaments as close as practical to the flame 34 and to reduce the rate of erosion of the underside of the filament guide.

FIGS. 3 and 4 show a first embodiment of the filament guide 32 of the present invention wherein the filament guide includes an elongated rod 132 having a generally semicircular transverse cross section with a curved upper surface 134 and a flat or planar or substantially flat or planar lower surface 136. The upper curved surface has a plurality of grooves 138 therein which are defined by a plurality of ribs 140 separated by a plurality of narrow channels 142 which receive the continuous filaments 24. Preferably, the ribs 140 have rounded outer surfaces 144 and the channels 142 have flat or rounded bottom surfaces 146. The grooves 138 extend in planes oriented perpendicular to or substantially perpendicular to the longitudinal axis of the elongated rod 132.

The flat or planar or substantially flat or planar lower surface 136 of the elongated rod 132 is made flat or planar to provide the elongated rod 132 with a surface adjacent the flame over which the flame can freely pass without obstruction to reduce the rate of erosion of the lower surface 136 by the flame 34 of the burner 30. The ends of the elongated rod 132 are provided with threaded projections 148 or other fastening means for securing the elongated rod to the support brackets 36.

FIGS. 5, 6 and 7 show a second embodiment of the filament guide 32 of the present invention wherein the filament guide includes an elongated rod 232 having flat or planar or substantially flat or planar upper and lower surfaces 234 and 236 and curved side surfaces 238 and 240 extending between the upper and lower surfaces 234 and 236. The curved side surfaces 238 and 240 each have a plurality of grooves 242 therein which are defined by a plurality of ribs 244 separated by a plurality of narrow channels 246 which receive the continuous filaments 24. Preferably, the ribs 244 have rounded outer surfaces 248 and the channels 246 have flat or rounded bottom surfaces 250. The grooves 242 extend in planes oriented perpendicular to or substantially perpendicular to the longitudinal axis of the elongated rod 232.

The flat or planar or substantially flat or planar upper and lower surfaces 234 and 236 of the elongated rod 232 are made flat or planar to provide the elongated rod 232 with two surfaces, that can be positioned immediately adjacent the flame 34, over which the flame 34 can freely pass without obstruction to reduce the rate of erosion of the surfaces 234 and 236 by the flame 34 when these surfaces are positioned immediately adjacent the flame 34 of the burner 30.

The ends of the elongated rod 232 are provided with threaded projections 252 which can be anchored to the support brackets 36 with nuts or other fastening means for securing the elongated rod 232 to the support brackets 36. By tightening fastening nuts, the elongated rod 232 is firmly held or locked in place. By loosening the nuts on the threaded projections 252, the elongated rod 232 can be rotated about its longitudinal axis. Thus, when the underside of the elongated rod, either surface 234 or 236 has been eroded by the flame 34 to a predetermined extent, the nuts on the projections 252 are loosened; the elongated rod 232 is rotated through 180° to bring the other flat or planar surface 234 or 236 into position immediately adjacent the flame 34; and the nuts are tightened to lock the elongated rod 232 in place. By rotating the elongated rod 232 when a certain amount of erosion of either surface 234 or 236 has taken place, the failure of the elongated rod 232, due to a bowing of a weakened filament guide and support midsection of the elongated rod 232 is prevented, and the service life of the elongated rod 232 is prolonged.

FIGS. 8 and 9 show a third embodiment of the filament guide 32 of the present invention wherein the filament guide includes an elongated rod 332 having a generally triangular transverse cross section with flat or planar or substantially flat or planar surfaces 334, 336 and 338 and intermediate curved surfaces 340, 342 and 344 extending between the flat or planar surfaces. The intermediate curved surfaces 340, 342 and 344 each have a plurality of grooves 346 therein which are defined by a plurality of ribs 348 separated by a plurality of narrow channels 350 which receive the continuous filaments 24. Preferably, the ribs 348 have rounded outer surfaces 352 and the channels 350 have flat or rounded bottom surfaces 354. The grooves 346 extend in planes oriented perpendicular to or substantially perpendicular to the longitudinal axis of the elongated rod 332.

The flat or planar or substantially flat or planar surfaces 334, 336 and 338 of the elongated rod 332 are made flat or planar to provide the elongated rod 332 with three surfaces, which can be positioned immediately adjacent the flame 34, over which the flame 34 can freely pass without obstruction to reduce the rate of erosion of the surfaces 334, 336 and 338 by the flame 34 when these surfaces are positioned immediately adjacent the flame 34 of the burner 30.

The ends of the elongated rod 332 are provided with threaded projections 356 which can be anchored to the support brackets 36 with nuts or other fastening means for securing the elongated rod 332 to the support brackets 36. By tightening fastening nuts, the elongated rod 332 is firmly held or locked in place. By loosening the nuts on the threaded projections 356, the elongated rod 332 can be rotated about its longitudinal axis. Thus, when the underside of the elongated rod 332, either surface 334, 334 or 338 has been eroded by the flame 34 to a predetermined extent, the nuts on the projections 356 are loosened; the elongated rod 332 is rotated through 120° to bring another of the flat or planar surface 334, 336 or 338 into position immediately adjacent the flame 34; and the nuts are tightened to lock the elongated rod 332 in place. By rotating the elongated rod 332 when a certain amount of erosion of one of the surface 334, 336 or 338 has taken place, the failure of the elongated rod, due to a bowing of a weakened filament guide and support midsection of the elongated rod is prevented, and the service life of the elongated rod 332 is prolonged.

The elongated rods 132, 232 and 332 of the embodiments of the filament guide 32 shown in FIGS. 3–9, can be made entirely of a ceramic material that is easily machinable, has good durability at high temperatures (e.g. 1500° F.) and a low coefficient of thermal expansion (e.g. $3.0 \times 10^{-6}$ inches/inch degree Centigrade), such as hot pressed boron nitride; and preferably from ceramic materials which exhibit all of the above physical properties plus a high thermal conductivity. Ceramic materials having a thermal conductivity greater than 15 watts per meter—° K. at 25° C. are preferred. Ceramic materials such as but not limited to, nitrides of aluminum and boron which have high thermal conductivities are acceptable. Boron-nitride with its lubricating or anti-sticking property is especially preferred.

The elongated rods 132, 232 and 332 of the filament guides of FIGS. 3–9 can also be made of graphite. However, in the preferred embodiments of the present invention, the elongated rods 132, 232 and 332 are a ceramic coated graphite wherein the ceramic coating has a greater thermal conductivity than graphite to assist in the dissipation of the heat from the burner flame 34 by spreading the heat throughout the surface of the elongated rod. By conducting the heat, transferred from the burner flame 34 to the undersides of the elongated rods, away from the undersides of the elongated rods and dissipating the heat over the entire or substantially the entire outer surface of the elongated rods 132, 232 and 332, the temperatures of the undersides of the elongated rods are reduced. This reduction in temperature enables these surfaces of the elongated rods to better withstand the erosive effects of the burner flame 34. Due to its relatively high thermal conductivity and lubricating or anti-stick properties, boron-nitride is one of the most preferred ceramic coating for the graphite rods 132, 232 and 332.

Preferably, the elongated rods 132, 232 and 332 are made by machining the rods to the desired cross sectional configuration and then grooving the elongated rods using conventional machining techniques. After the elongated rods 132, 232 and 332 have been machined, high pressure air is used to remove particles from any grooves and any pores in the elongated rods. The elongated rods are then dipped in acetone and wiped clean to remove any remaining particles. A coating of the ceramic coating material, e.g. boron-nitride, is then applied preferably to the entire surface or substantially the entire surface of the elongated rod 132, 232 or 332. The elongated rod is again dipped in acetone and wiped clean and most preferably a second coating of ceramic coating material is applied to the entire surface or substantially the entire surface of the elongated rod.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A filament guide for providing support and guidance to continuous filaments as the continuous filaments are introduced into a high temperature, high energy gaseous stream of combustion gases for attenuation, comprising:

an elongated rod having a longitudinal axis and a longitudinally extending guide and support section of a selected length with a plurality of grooves therein extending in planes generally perpendicular to said longitudinal axis of said elongated rod for receiving a plurality of continuous filaments to guide and support said continuous filaments; and said elongated rod being made of a first high temperature resistant material and having a coating thereon of a ceramic material having a higher thermal conductivity than said first high temperature resistant material to dissipate the heat from a burner flame when said filament guide is in service.

2. The filament guide according to claim 1, wherein: said elongated rod has a transverse cross section, perpendicular to said longitudinal axis, with a substantially straight portion and a curved portion; said transverse cross section of said elongated rod extends for said length of said guide and support section to form a flat surface and a curved surface; and said grooves are in said curved surface of said elongated rod.

3. The filament guide according to claim 2, wherein: said transverse cross section of said elongated rod is a generally semicircular transverse cross section.

4. The filament guide according to claim 2, wherein: said transverse cross section of said elongated rod is a generally triangular transverse cross section; said flat surface is one of three flat surfaces and said curved surface is one of three curved surfaces intermediate each of said three flat surfaces; and each of curved surfaces has said grooves therein whereby by rotating said elongated rod about said longitudinal axis of said elongated rod each of said three flat surfaces can be sequentially positioned to be immediately adjacent a burner flame and each of said three grooved surfaces can be sequentially positioned to guide and support said continuous filaments to extend the service life of said filament guide.

5. The filament guide according to claim 2, wherein: said elongated rod has first and second longitudinally extending flat surfaces with said flat surface being one of said first and second flat surfaces and first and second longitudinally extending curved surfaces extending between said first and second flat surfaces with said curved surface being one of said first and second curved surfaces; and each of said first and second curved surfaces have said grooves therein whereby by rotating said elongated rod about said longitudinal axis of said elongated rod said first and second surfaces can be sequentially positioned immediately adjacent a burner flame and said first and second grooved curved surfaces can be sequentially positioned to guide and support said continuous filaments to extend the service life of said filament guide.

6. The filament guide according to claim 1, 2, 3, 4, or 5 wherein: said rod is made of graphite and said coating is a boron-nitride coating.

7. In a flame attenuation apparatus for forming flame attenuated fibers including a means for providing continuous filaments; burner means for providing a high temperature, high energy stream of combustion gases; means for feeding said continuous filaments into said high temperature, high energy stream of combustion gases; and guide means for guiding and supporting said continuous filaments as said filaments are fed into said high temperature, high energy stream of combustion gases, the improvement comprising:

said guide means comprising an elongated rod having a longitudinal axis extending generally perpendicular to a direction of travel of said plurality of continuous filaments; said elongated rod having a longitudinally extending guide and support section of a selected length with plurality of grooves therein extending in planes generally perpendicular to said longitudinal axis for receiving said plurality of said continuous filaments to guide and support said plurality of continuous filaments; said elongated rod being located immediately adjacent a flame of said burner means; and said elongated rod being made of a first high temperature resistant material and having a coating thereon of a ceramic material having a higher thermal conductivity than said first high temperature resistant material to dissipate heat from said burner flame when said flame attenuation apparatus is in service.

8. The flame attenuation apparatus for forming flame attenuated fibers according to claim 7, wherein: said elongated rod has a transverse cross section, perpendicular to said longitudinal axis, with a substantially straight portion and a curved portion; said transverse cross section of said elongated rod extends for said length of said guide and support section to form a flat surface and a curved surface; said grooves are in said curved surface of said elongated rod; and said flat surface of said elongated rod is positioned immediately adjacent said flame of said burner.

9. The flame attenuation apparatus for forming flame attenuated fibers according to claim 8, wherein: said transverse cross section of said elongated rod is a generally semicircular transverse cross section.

10. The flame attenuation apparatus for forming flame attenuated fibers according to claim 8, wherein: said transverse cross section of said elongated rod is a generally triangular transverse cross section; said flat surface is one of three flat surfaces and said curved surface is one of three curved surfaces intermediate each of said three flat surfaces; and each of curved surfaces has said grooves therein whereby by rotating said elongated rod about said longitudinal axis of said elongated rod each of said three flat surfaces can be sequentially positioned to be immediately adjacent said burner flame and each of said three grooved surfaces can be sequentially positioned to guide and support said continuous filaments to extend the service life of said filament guide.

11. The flame attenuation apparatus for forming flame attenuated fibers according to claim 8, wherein: said elongated rod has first and second longitudinally extending flat surfaces with said flat surface being one of said first and second flat surfaces and first and second longitudinally extending curved surfaces extending between said first and second flat surfaces with said curved surface being one of said first and second curved surfaces; and each of said first and second curved surfaces have said grooves therein whereby by rotating said elongated rod about said longitudinal axis of said elongated rod said first and second surfaces can be sequentially positioned immediately adjacent said burner flame and said first and second grooved curved surfaces can be sequentially positioned to guide and support said continuous filaments to extend the service life of said filament guide.

12. The filament guide according to claim 7, 8, 9, 10, or 11 wherein: said rod is made of graphite and said coating is a boron-nitride coating.

* * * * *